United States Patent [19]

Zaepfel et al.

[11] 4,152,323
[45] May 1, 1979

[54] PROCESS FOR REMOVING WATER FROM GLUE STOCK

[75] Inventors: Horst Zaepfel, Beide Karlsruhe; Erich Gabelmann, Karlsruhe; Kasimir Hofmann, Forst, all of Fed. Rep. of Germany

[73] Assignee: Arenco-BMD Maschinenfabrik GmbH, Karlsruhe, Fed. Rep. of Germany

[21] Appl. No.: 800,850

[22] Filed: May 26, 1977

[30] Foreign Application Priority Data

May 26, 1976 [DE] Fed. Rep. of Germany ....... 2623498

[51] Int. Cl.² .............................................. C09H 3/00
[52] U.S. Cl. .................................... 260/118; 426/437; 426/495; 426/805; 71/15; 210/56; 210/71; 260/412.5; 260/412.6
[58] Field of Search ................... 210/42 R, 45, 48, 56, 210/65, 71; 71/18, 25, 15; 260/412.5, 412.6, 112 R, 118, 117; 426/437, 495, 576, 805, 512, 513; 17/45

[56] References Cited

U.S. PATENT DOCUMENTS

| | | | |
|---|---|---|---|
| 49,383 | 8/1865 | Cooper | 260/412.5 |
| 443,940 | 12/1890 | Griffin | 260/412.5 |
| 706,075 | 8/1902 | Lubberger | 210/56 |
| 869,272 | 10/1907 | Spence | 210/56 |
| 1,347,823 | 7/1920 | Peck | 210/45 |
| 2,261,924 | 11/1941 | Pittman | 71/25 |
| 2,277,718 | 3/1942 | Sanders | 210/56 |
| 2,301,242 | 11/1942 | Billaudot | 260/118 |
| 2,328,361 | 8/1943 | Sanders | 210/56 |
| 2,398,004 | 4/1946 | Houck | 260/118 |
| 2,400,375 | 5/1946 | Sheppard | 260/118 |
| 2,708,630 | 5/1955 | Davis | 260/412.5 |
| 2,743,265 | 4/1956 | Garono | 260/118 |
| 2,746,949 | 5/1956 | Lolli | 260/118 |
| 2,748,152 | 5/1956 | Sifferd et al. | 260/118 |
| 3,215,275 | 11/1965 | Bastecky | 210/56 |
| 3,936,375 | 2/1976 | Nettli | 210/56 |

FOREIGN PATENT DOCUMENTS

545942 9/1957 Canada .................................... 260/118

OTHER PUBLICATIONS

Bruttini, Uses of Waste Materials, London, 1923, King & Son, LTD., p. 250.

*Primary Examiner*—Thomas G. Wyse
*Assistant Examiner*—Ernest G. Therkorn
*Attorney, Agent, or Firm*—Craig & Antonelli

[57] ABSTRACT

A process is disclosed for treating glue stock so as to remove water and fat therefrom and render the glue stock useful as fertilizer, fertilizer supplements or animal feed. The process comprises heating the glue stock to a temperature between 40° and 80° Celsius, mechanically pressing it to express liquid therefrom and after said pressing cooling the glue stock to prevent the decomposition or cementing of the glue stock.

2 Claims, No Drawings

PROCESS FOR REMOVING WATER FROM GLUE STOCK

Glue stock occurs as waste in fleshing skins and hides, and comprises fatty tissue, bits of skin etc. Because of the chemical tanning process that precedes the fleshing operation, it has a lot of liquid in it, consisting of water and containing chemicals, so that it comprises a spongy mass. This material was previously processed by glue manufacturers but the productio of natural glues is decreasing, in favor of synthetic glues, not least because of regulations concerning environmental protection. On the other hand, the glue stock cannot be disposed of in the usual waste disposal operation because this would run counter to regulations on environmental protection.

The main cause for the poor utilizability of glue stock lies in its high water content, which leads to putrefaction and processes of decomposition. For this reason, the attempt has been made to extract the water from glue stock by subjecting it to pressure in a screw press (German OS 1,944,153). It is true that success was attained with this device, but it was only the surface water that was forced out.

The major part of the water is cellularly bound, whereby also chemical binding processes play a role in an alkaline medium. For this reason the effort was made to lower the pH value of the mass by treatment with acids or acid salts. It is true that water removal is possible, but metering the chemicals is difficult. Also, the high fat fraction remains as before in the glue stock, because the fat is not affected by acid treatment.

The basis of the invention is proposal of a process for removal of water from glue stock, whereby good water removal is achieved without addition of chemicals, and with slight use of apparatus.

This problem is solved in that the glue stock is heated to a temperature between 40 and 80 degrees Celsius, and at the same time or subsequently it is mechanically pressed.

It has been found that in heating the glue stock to a relatively low temperature, the water is driven off with most of the chemical residues, whereby the supplementary effect occurs, namely that the fat is converted to a state in which it is capable of flowing, so that it collects on the surface of the glue stock with the water. By the subsequent mechanical pressing, the water-fat mixture which is like an emulsion is removed. The glude stock is obtained with a water content of about 50 percent, and can also be subjected to after-drying. It can be deposited [as a semi-solid] and can therefore be delivered for ordinary waste disposal. Instead of this, the substance can be used as fertilizer or as a fertilizer supplement, which was not possible heretofore because of the fat content, because the soil would undergo fatty degeneration. Likewise, this fat-free glue stock can be further processed because of its high protein concentration, as animal feed.

Practical experiments have shown the favorable treatment temperature to be 50 to 60 degrees Celsius. Temperatures above 80 degrees Celsius are unfavorable because in this range there is a decomposition—a cementing—of the material which again has the consequence of a stronger binding capability for the liquid.

According to another characteristic of the invention, the expressed liquid is separated into its essential components, fat and water. This separation is possible in conventional ways. Analysis of the obtained fat shows that it can be further processed without difficulty, either to make technical fats or dubbing material.

To effect the process, a receptacle can be used that receives the glue stock and heats it directly or indirectly, and a press that puts the heated glue stock under pressure, e.g. a screw press. Instead of this, a heated press may be provided.

It has been shown to be advantageous to cool the glue stock down after expression of water and fat, to ambient temperature, to prevent the cementing process that begins even at temperatures around 60 degrees Celsius.

We claim:
1. Process for removing water from glue stock consisting essentially of heating the glue stock to a temperature between 40 and 80° Celsius and at the same time or subsequently mechanically pressing the glue stock so as to express a fat-water mixture therefrom and after said pressing cooling the glue stock to prevent the decomposition or cementing of the glue stock whereby said glue stock is useful as a fertilizer or fertilizer supplement or as an animal feed.

2. Process as in claim 1, wherein the glue stock is heated to a temperature of 50 to 60 degrees Celsius.

* * * * *